July 19, 1949.  S. H. EDWARDS  2,476,711
VALVE
Filed Nov. 12, 1943
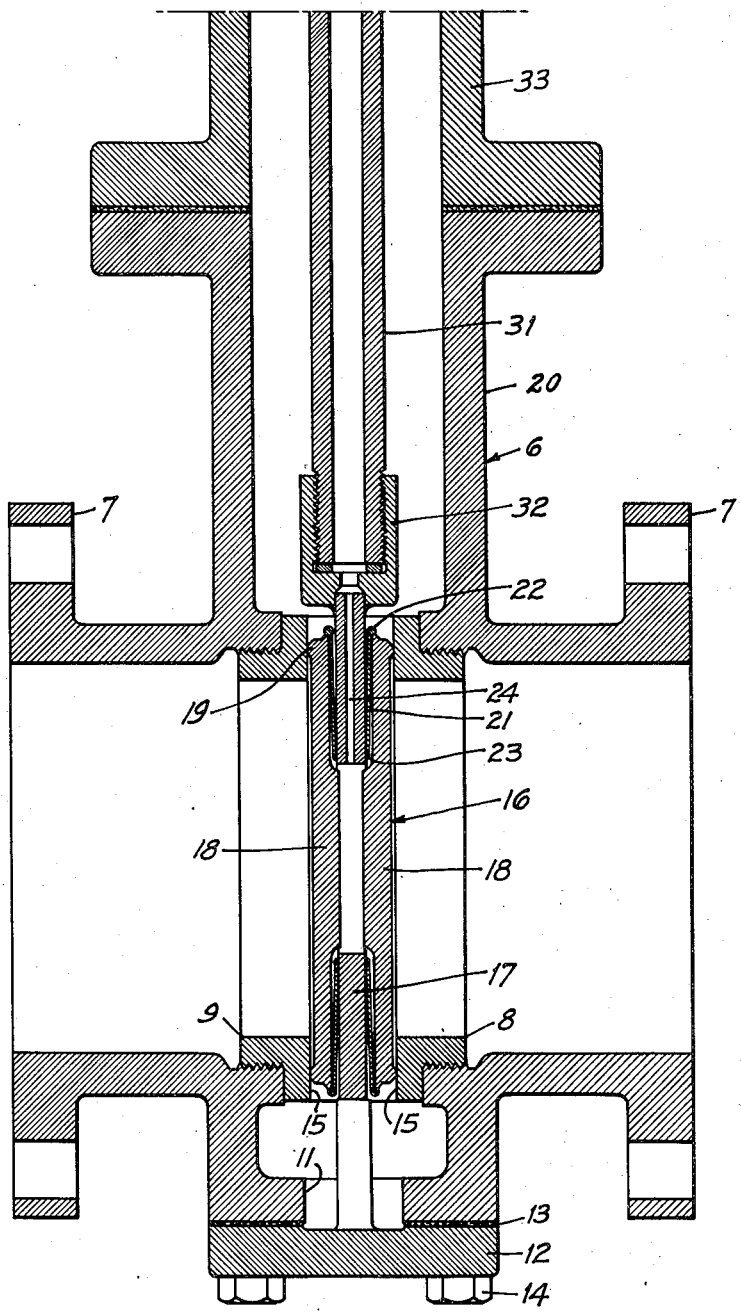
INVENTOR.
Samuel H. Edwards
BY
ATTORNEY.

Patented July 19, 1949

2,476,711

UNITED STATES PATENT OFFICE 2,476,711

VALVE

Samuel H. Edwards, Richmond, Calif.

Application November 12, 1943, Serial No. 509,971

3 Claims. (Cl. 251—65)

This invention relates to a valve and particularly to a novel valve construction which enables a tight shut-off to be established on both the upstream and the downstream side of the valve. This is a feature of considerable advantage. For example, in cyclic catalytic reforming plants it is necessary to cut off fluid flow positively, for slight leaks from either side of the valve to the other side, or from either side of the valve to the atmosphere, are extremely hazardous. The valve of the present invention also enables a tight shut-off to be established even though the valve is under mechanical strain or if one side of the valve is at a materialy different temperature from the other side.

Briefly, the valve of the present invention includes the usual valve body. Valve seats are provided in this body on the upstream and downstream sides. A gate is movable across these seats to control flow of fluid. The gate structure is novel in that it includes two seating members, one for each valve seat. The seating members are carried upon the gate by flexible bellows; when a fluid under pressure is admitted to the interior of the gate, the movable seating members are moved positively to engage the seats. The gate can be moved across the valve seats from an open to a closed position by manual manipulation of a hand wheel cooperating with a screw thread of the valve stem. Admission of the fluid to expand the gate is so regulated that it can only occur when the gate is in its lowermost position. This feature is desirable to insure that the expandable gate is not damaged by expansion prior to lowering of the gate into its closed position. It will be obvious that the operating force required to open the valve is very little, particularly if the valve is under pressure from a fluid in the line.

It is the general broad object of the present invention to provide a novel, fluid-control expanding gate valve.

A further object of the present invention is to provide a simple, rugged gate which can be expanded by a fluid in cooperation with a suitable valve body and valve seat.

The invention includes other objects and features of advantage, some of which, together with the foregoing, will appear hereinafter wherein the present preferred form of valve structure of this invention is disclosed.

In the drawing accompanying and forming a part hereof, the single figure is a section illustrating the gate construction of the present invention.

Referring to the drawings, numeral 6 indicates a valve body having flanges 7 thereon enabling the body to be installed in a pipe line. Valve seats 8 and 9 are provided in the valve body, these being inserted and screwed into place through bonnet 29. A cleanout opening 11 is provided in the bottom of the valve and is closed by a plate 12 and gasket 13 secured in place by studs 14. Each valve seat has a seating portion 15 formed thereon. I prefer that these seating portions be parallel to each other; if desired they can be at a slight angle to each other to provide a wedge shaped receptacle for the gate generally indicated at 16. In this last case, the wedge opens toward the top of the valve, the smallest side of the wedge being adjacent the bottom of the valve.

The valve gate is a composite structure made up of a central annular member 17 and two circular plates 18 having suitable portions 19 formed thereon to engage the valve seat faces 15. Each circular plate is movably joined to the central annular member 17 by a flexible connection provided by a flexible metal annulus 21 joined to the peripheral edge of the circular plate 18 by welding as at 22 and to the annulus 17 by welding as at 23. A fluid passage 24 extends through the annulus 17 to permit fluid to be admitted and withdrawn to the fluid-tight chamber formed by circular plates 18 and the flexible annuli 21 together with the central annulus 17. Fluid under pressure is supplied to the fluid-tight chamber through passage 24 from a presently described source.

To raise and lower the gate 16 a suitable valve stem is provided, being indicated generally at 31. A threaded sleeve 32 is secured to the gate 16 to receive the threaded end of the hollow valve stem 31. The valve stem 31 extends upwardly through an extension 33 secured to the body 6, the extension and body being of sufficient height to permit full opening of the gate valve.

The gate 16 can be raised and lowered by means of the valve stem in any suitable manner and one can utilize a hand wheel and threaded stem construction as in Figure 1 of the Schmidt et al. Patent 2,325,802 or a cylinder and piston construction as in Figure 21 of the La Mont Patent 1,826,941. When the gate is in the position shown, fluid under pressure can be admitted or released from the interior of the gate under a suitable control such as appears in Figure 4 of the aforementioned Schmidt patent.

I claim:

1. In a valve of the character described, a valve seat surrounding a valve port providing a fluid passageway, a valve closure comprising a central annular member having an opening centrally thereof, a valve seating member on at least one side thereof adapted to seat on said port to close said passageway and consisting of a flat, circular disc of substantially the same diameter as said annular member, and an annular flexible sealing member having its outer edge secured to the outer peripheral edge of said disc and its inner edge secured to the annular member adjacent to the periphery of said opening in said annular member.

2. In a valve of the character described, a valve seat surrounding a valve port providing a fluid passageway, a valve closure comprising a central annular member having an opening centrally thereof, a valve seating member on at least one side thereof adapted to seat on said port to close said passageway and consisting of a flat, circular disc of substantially the same diameter as said annular member, and an annular flexible sealing member having its outer edge secured to said disc and its inner edge secured to said annular member and lying substantially everywhere behind said disc.

3. In a valve of the character described, a valve seat surrounding a valve port providing a fluid passageway, a valve closure comprising a closure support member having an opening substantially centrally thereof, a valve seating member on at least one side of said closure support member and adapted to seat on said valve port to close said passageway and consisting of a flat valve member of substantially the same peripheral outline as said port and of a size sufficient to seat upon and close said port, and a substantially annular flexible sealing member extending inwardly from and having its outer edge secured adjacent the peripheral edge of said flat valve member and having its inner edge joined to the inside edge of the opening in said closure support member to support the valve member for movement toward and away from said port.

SAMUEL H. EDWARDS.

REFERENCES CITED

The following references are of record in the file of this patent:

UNITED STATES PATENTS

| Number | Name | Date |
|---|---|---|
| 686,703 | Bickford | Nov. 19, 1901 |
| 712,485 | Bickford | Nov. 4, 1902 |
| 715,745 | Bickford | Dec. 16, 1902 |
| 1,826,941 | LaMont | Oct. 13, 1931 |
| 1,957,807 | Robinson | May 8, 1934 |
| 2,325,802 | Schmidt | Aug. 3, 1943 |

FOREIGN PATENTS

| Number | Country | Date |
|---|---|---|
| 287,476 | Italy | July 22, 1931 |